Aug. 3, 1926.

E. J. WALT

DEPOSIT BOOK

Filed July 11, 1923

Inventor
Emile John Walt
by his Attorneys
Baldwin & Wight

Patented Aug. 3, 1926.

1,594,480

UNITED STATES PATENT OFFICE.

EMILE JOHN WALT, OF NEW ORLEANS, LOUISIANA.

DEPOSIT BOOK.

Application filed July 11, 1923. Serial No. 650,913.

Christmas savings clubs, vacation clubs, and many other similar partial payment clubs are very numerous at the present time, and in many other financial transactions partial payments are made over quite a period of time. In all such cases there is needed some system of keeping accounts which will insure that the depositor and the bank may always be aware of the exact amount paid to date, the time of the next payment as well as its amount, and frequently other items of similar data. Such a system should permit one or more payments to be made at any time with as little trouble as possible to the depositor and the bank, and with the minimum possibility of error.

Many systems have been devised and are in present use. Some of these depend upon duplicate cards that are punched simultaneously, while others furnished the depositor with coupon books containing one coupon and a corresponding stub for each payment. In general these are open to objection for one reason or another. The coupon system requires the book keeper to handle a coupon for each payment, even if five or ten payments are made simultaneously, thus causing much labor.

An object of my invention is to provide such a system and means for carrying it out which will obviate many of the objections inherent in previous systems, and enable partial payment accounts of all classes to be handled expeditiously, and with practically no danger of error.

Another object is to provide such a means whereby any number of payments can be made simultaneously by the use of only one slip, thus enabling the bookkeeper to enter the same on the ledger and card record with only one entry.

Another object is to provide such a means whereby the correctness of the entry of each payment is automatically checked when being entered.

Other objects will be apparent from the following detailed description and the appended claims.

In the drawings:

Figure 1 is a view of the depositor's book open, with one leaf detached and about to be removed.

Figure 2 is a view of the ledger sheet used in connection therewith.

Figure 3 is a view of the card record that may be kept if desired.

The deposit book A consists of a cover sheet having three members, a central part 1 and side members 2 and 3 adapted to fold over the central part when the book is closed. On the outside of these three parts will be printed any desired data, such as the name of the bank, rules, character of the account, depositor's name, and any similar matter. This can be varied as desired and forms no part of the invention. Folds 2 and 3 are intended to have a consecutive list of the number of the payments, the weekly amount, total paid in to date, and a blank space in which will be stamped the date of each payment as made. If it is desired, all of this data may be printed on sheet 2 leaving sheet 3 for other information, but it will ordinarily be found preferable to spread the data over both sheets in order to avoid too small print. The two sheets 2 and 3 will also contain the "class" number or letter and any other identifying data that may be necessary or desirable in the particular use that is being made of the book and system. The three sheets 1, 2 and 3 constitute a cover and are preferably made integral of paper of any desired character, and will be formed of any suitable size.

The inside of the central sheet 1 is left blank and affixed thereto are slips 4. These may be stapled thereto as shown and perforated near the point of stapling to permit the quick detachment of each slip. These slips constitute a filler and are identical. Each slip contains the data that is placed on sheets 2 and 3, in slightly different arrangement, as well as the identifying data found on said sheets. Each slip also contains near the bottom a space to be filled in showing the number of payments covered by the particular deposit and also the amount paid at that time.

The ledger sheet B is adapted to be used with the particular deposit book just describe and has the usual identifying data pertaining to the particular account as well as name and address of the depositor. It contains the same data as that on sheets 2 and 3 and also a column for amount paid in which is entered the sums appearing at the bottom of the slips 4.

Instead of the ledger sheet B, or in addition thereto if desired, there may be employed a card C which contains the same or substantially the same data as the ledger sheet B.

The manner of using the deposit book and ledger sheet will now be described. If the depositor desires to make the first five payments at once on January 7, the teller will stamp date (and identifying initial if desired) on line 5 of sheet 2 of the deposit book. He will also stamp the same date on the top slip 4ª and the next to the top slip 4 on line 5 of each. The teller then tears off the top slip 4ª, and writes the number of weeks paid for (or number of payments) and amount paid in the spaces provided for at the bottom of this slip. In the present instance the number of weeks paid is 5 and the amount paid is $1.50. This slip is retained by the bank and used to post to ledger sheet or card and is kept as a deposit slip for the office record. The top slip now remaining in the deposit book and the sheet 2 of the book both show the same date on line 5, which line 5 also shows the total amount paid to date, or $1.50.

If on February 7, the depositor desires to make another payment of five weeks, the teller notices that the last payment was on line 5 and knows that five weeks more will bring the payments to line 10. He therefore stamps date and initial on line 10 of the deposit book, and on the top and next to the top slip now remaining. The top slip which is now removed for the bank records shows two dates stamped while the slip left in the deposit book shows only the last date Feb. 7. The deposit book itself will show on line 5 the date Jan. 7, and on line 10, the date Feb. 7. When this payment is made the amount to be received from the member is the difference between the amounts opposite the two dates in the column headed "Total paid in". In this instance it will therefore be the difference between $5.50 and $1.50, or $4, which amount the teller enters on the bottom of the slip retained by the bank as explained above.

Subsequent payments will be handled in exactly the same manner, and it is to be emphasized that no matter how many payments are made at one time, only one slip needs be detached and only one date is stamped on the various slips.

At the end of the day, or at any desired time, the amounts paid in can be listed on the adding machine simply by taking the amounts at the bottom of each slip, so that if a payment covers five weeks, only one slip is used and only one amount need be written on the adding machine instead of five in the usual plan. Where a large number of deposits are handled, the saving of time is remarkable. If payments are made weekly, the amount at the bottom of the slips need not be filled in, as the slip itself shows the amount collected by the week.

The slip is used to post to ledger sheet or card and the book keeper will post from the number of weeks and amount as shown on the bottom of the slip, writing in the present instance Jan. 7 and $1.50 on line 5 in the proper columns as shown in Figure 2. Similarly the second payment is filled in on line 10 as shown.

This system prevents errors and fraud and automatically checks the posting. For example, when the book keeper starts to enter the Feb. 7 payment, he notices that line 5 of the ledger sheet or card shows that $1.50 was paid on Jan. 7. This also corresponds with the date of the previous payment on slip 4. He then posts from the bottom of the slip which shows $4 as the amount, and this is written on line 10. If the payments have been correct, and are properly entered, the sum of the payments will be equal to the amount printed in the column "Total paid in" on line 10, or $5.50 in the present instance. If this is not the case, one or the other amounts is wrong or the last amount has been entered on the wrong line. Every entry can thus be instantly checked and the system lends itself to absolute accuracy with great simplicity.

Also, each slip automatically checks the previous one, since each slip (after the initial payment) has two dates stamped thereon, and since each date is initialed by the employee receiving the payment, it is practically an impossible matter for an error to be made and passed, either intentionally or otherwise.

The ledger card may be used as an alternative to the sheet and is used in exactly the same manner. It has not been thought necessary to explain this in detail.

It will be obvious that this deposit book and system permit the operation of partial payment systems with ease and accuracy and with a minimum of book keeping labor. Certain detail changes may be made in the arrangement of the data on the various sheets and slips, and other modifications will be apparent to those skilled in the art. It is to be understood that the invention is regarded as limited only by the scope of the appended claims.

I claim as my invention:

1. A deposit book for partial payments comprising a cover and a filler, the inside of the cover having printed thereon data indicating the number of payments, the amount of each payment, the total amount paid, and having appropriately-designated spaces for the date of payments as made, and the filler consisting of a plurality of identical detachable slips provided with the same data as the cover and with appropriately-designated spaces for the amount paid and the number of payments it covers, whereby a single slip may cover any number of payments.

2. A deposit book for partial payments comprising a cover and a filler, the cover having printed thereon data indicating the number of payments, the amount of each payment, the total amount paid, and having appropriately-designated spaces for the date of payments as made, and the filler consisting of a plurality of identical detachable slips provided with the same data as the cover, whereby the stamping of date of payment in proper position enables a single slip to cover any number of payments.

3. A deposit book for partial payments comprising a portion always retained by the depositor and having printed thereon data indicating the number of payments, the amount of each payment, the total amount paid, and having appropriately-designated spaces for the date of payments as made, and a portion consisting of a plurality of identical detachable slips containing the same data and having appropriately-designated spaces for the amount paid and the number of payments it covers.

In testimony whereof, I have hereunto subscribed my name.

EMILE JOHN WALT.